C. L. HEISLER.
LOCOMOTIVE TRAILING TRUCK.
APPLICATION FILED NOV. 6, 1914.
1,126,761.
Patented Feb. 2, 1915.
2 SHEETS—SHEET 1.
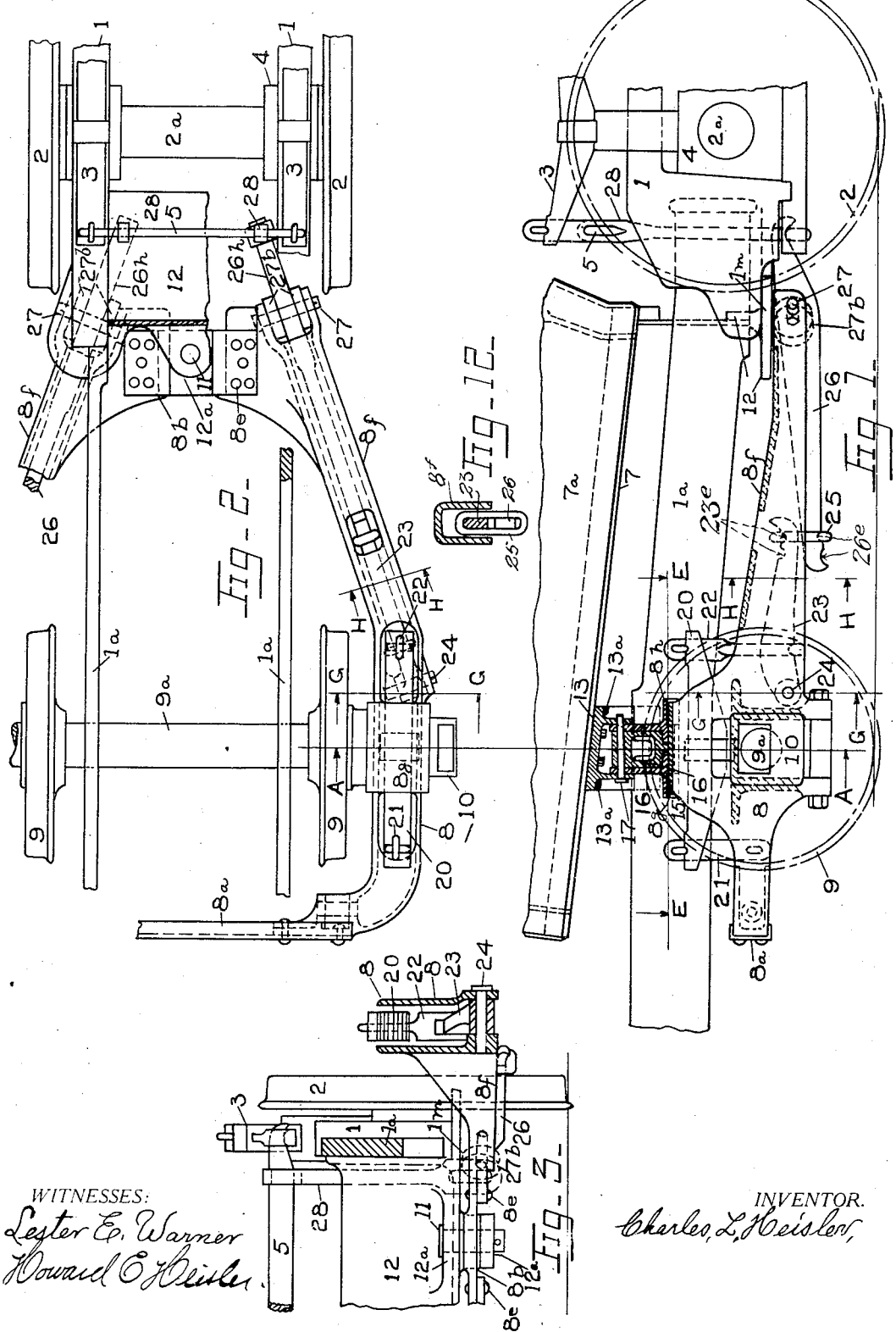
WITNESSES:
Lester E. Warner
Howard E. Heisler
INVENTOR.
Charles L. Heisler C. L. HEISLER.
LOCOMOTIVE TRAILING TRUCK.
APPLICATION FILED NOV. 6, 1914.
1,126,761.
Patented Feb. 2, 1915.
2 SHEETS—SHEET 2.
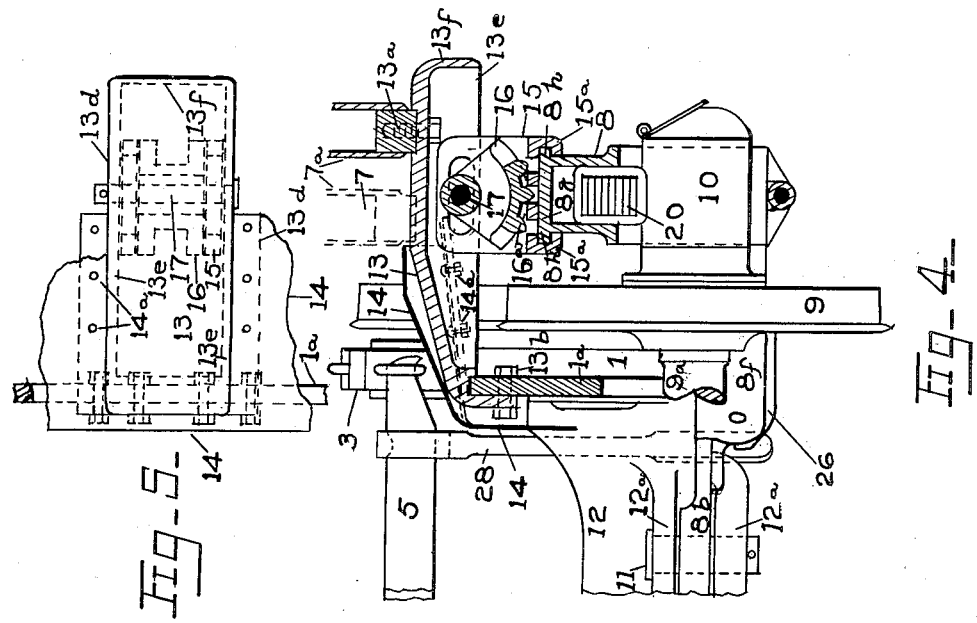
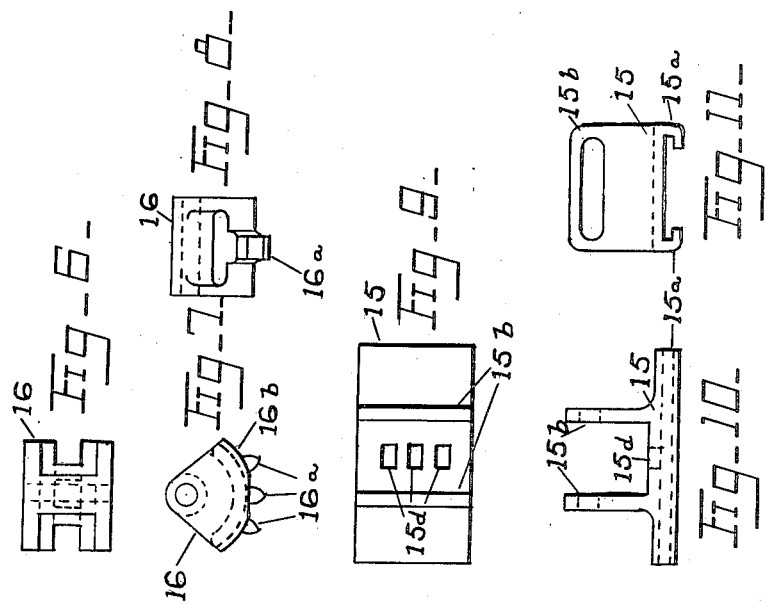
WITNESSES:
Lester E. Warner
Howard E. Heisler
INVENTOR.
Charles L. Heisler,

UNITED STATES PATENT OFFICE.

CHARLES L. HEISLER, OF SCHENECTADY, NEW YORK.

LOCOMOTIVE TRAILING TRUCK.

1,126,761.  Specification of Letters Patent.  Patented Feb. 2, 1915.

Application filed November 6, 1914. Serial No. 870,595.

*To all whom it may concern:*

Be it known that I, CHARLES L. HEISLER, of Schenectady, in the county of Schenectady and State of New York, have invented certain new and useful Improvements in Locomotive Trailing Trucks, of which the following is a specification.

My invention relates to outside journaled, radial, trailing trucks for locomotives, more particularly to that type in which the axle boxes are embraced by pedestals formed upon the truck frame, and in which the truck springs are coupled with the locomotive driving box springs by an equalizing system.

One of the objects is to provide a simple self contained truck having all the truck spring equalizing rigging mounted thereon, so it may be economically manufactured as a complete unit, and readily coupled to the locomotive main frame and driver box spring equalizing rigging.

Another object is to provide a simpler means of controlling the resistance to lateral movement of the truck with respect to the locomotive main frame.

A further purpose is to materially reduce the weight and manufacturing cost of the spring equalizing system, and to provide a means for lifting the truck when the main frame is lifted from the wheels, axles and boxes by means of a crane.

An important object is to avoid weakening the rear, or supplementary slab section of the locomotive main frame near its attachment to the main frame by drilling for bolts that fasten an equalizer bracket thereto as is practice in locomotives of usual construction; to avoid transmitting objectionable stresses from the trailing truck spring equalizer system to the slab section near said attachment.

Another object is to provide a convenient means for quickly adjusting the distribution of weight upon the trailing truck springs by means of a jack screw, or similar device, without disconnecting one or more equalizers.

In the several drawings forming part of this specification, Figure 1, is a side view, in elevation, of a trailing truck embodying my invention and which is shown connected to a locomotive main frame and boiler firebox, with such portions omitted as are not directly related to my invention; Fig. 2, a three-fourths plan view thereof, with the firebox and all above the plane E E, omitted; Fig. 3, a transverse elevation giving a view of the right hand half thereof and is a transverse section taken on the plane G G; Fig. 4, is a transverse sectional elevation taken on the plane A A; Fig. 5, a detail plan view of a locomotive frame bracket shown in section in Fig. 4; Figs. 6, 7, 8, 9, 10 and 11 are detailed views of combined rocker and sliding bearing members interposed between the truck, boiler and main frame; Fig. 12, a transverse sectional elevation on the vertical plane H H, of the truck side frame.

The numeral 1, indicates the rear end of a locomotive main frame of usual construction and having a rearwardly projecting slab section $1^a$, formed thereon.

2 are rear driver wheels having an axle $2^a$, and form part of any well known system of coupled locomotive drivers, mounted in usual manner, and therefore are not shown in detail. The driver springs 3, are mounted upon the axle box 4, and form a part of well known equalized locomotive spring rigging in which the rear ends of the springs are coupled by a common form of cross equalizer, 5.

7 is a mud ring formed on the bottom of the locomotive firebox $7^a$, only a part of which is shown. The ash pan brakes and all parts not pertinently related to my invention, are for simplicity omitted.

The truck frame comprises a pair of oppositely disposed pedestal side members 8, connected at their rear ends by a cross tie $8^a$, preferably of channel section; and connected at their front ends by a laterally disposed coupling eye bar $8^b$, which is secured to the ends of the oppositely disposed side members by the rivets $8^c$. The center pin 11, couples the eye bar $8^b$, forming the front end of the truck frame, to the jaws $12^a$, formed on the cross tie 12, which is a part of the main frame 1, and is of well known construction, therefore, is not shown in detail. The diagonally disposed front sections $8^f$, of the side members 8, are preferably made of U, or box section for strength and extending to, or near, the front end of the frame, and are adapted to house, or inclose, a major portion of an equalizing mechanism to be described hereinafter. The truck wheels 9, are provided with an axle $9^a$, and boxes 10, of usual construction and which are positioned by the frame pedestal side members.

That portion of the locomotive's weight forming the burden supported by the truck wheels, is transferred directly to the truck frame from the boiler mud ring and main frame, through the frame bracket 13, which is fastened to the mud ring and main frame by the screw studs 13ª, and the bolts 13ᵇ. The mud ring 7, may be at a greater or lesser, distance outwardly from the main frame, as indicated by the dotted section in Fig. 4. Bolting flanges 13ᵈ, are formed on each side of the bracket 13, to provide a means for securing the ash pan, a broken portion or section thereof 14, being shown attached to the bracket by the small bolts 14ª. The bracket is preferably disposed above the truck frame at a point above, forward, or in the rear of the axle, whichever is best adapted to reduce the stresses in the truck frame with regard to stresses transmitted thereto from the spring equalizing rigging to be described hereinafter.

Directly under the bracket 13, there is formed on the truck frame, above the pedestal at 8ᵍ, a horizontally disposed flat sliding or wear surface, which projects laterally over the frame and forms a pair of flanges 8ʰ, that engage the gibs 15ª, formed on the sliding member 15, in a manner to permit a longitudinal movement, and prevent a lateral movement of the sliding member 15, with respect to the truck frame 8, to compensate for a forward, or rearward motion of the axle boxes, when the truck swings laterally about the center pin 11, from its mid, or neutral position. A segmental rocker 16, pivotally coupled by a pin 17, to the bracket 13, is disposed between two slotted upright sections 15ᵇ, of the sliding member 15. These slotted sections are disposed between, and positioned longitudinally by a pair of vertical and downwardly projecting wings 13ᵉ, formed on the bracket. These wings support the pin 17. A front apron section 13ᶠ, is formed on the bracket and is cast integral with the wings 13ᵉ, thereby forming a protecting housing for the rocker 16, and sliding member 15. The rocker is positioned with respect to its swing about the pin 17, by the gear teeth 16ª, formed thereon and which engage corresponding teeth 15ᵈ, formed in the base of the sliding member 15, upon which the curved rocker periphery 16ᵇ, is supported and thereby transmits the burden from the boiler, or main frame, to the truck frame. The rocker periphery may as usual be flattened to give initial resistance; the oppositely disposed and adjacent periphery sections may be curved to give any desirable lateral resistance, or nil resistance, to eliminate all twisting stress in the truck frame.

This arrangement provides sliding resistance in a direction at right angles to the resistance, if any, that may be offered by the rocker, and longitudinally with respect to the truck and main frame. The effect being to give a combined sliding and rocker resistance, or merely sliding resistance if desired, to the truck swing about the center pin 11. The bracket, sliding and rocker members, are coupled together and to the truck frame, by means of the pins and gibs in a manner to cause the truck to rise when the locomotive is lifted by a crane.

The truck spring 20, is mounted upon the axle box 9ª, between the pedestaled truck frame and coupled at its rear end to said truck frame by a rear spring hanger 21, in usual manner. The front end of the spring is coupled by a hanger 22, to the forwardly projecting arm of an equalizer lever 23, having its rear end pivotally mounted upon a pin bearing 24, formed on the truck frame adjacent to, and at the front of the pedestal and axle box 9ª. An equalizer link 25, couples the front end of the equalizer 23, with the rear end of the equalizer lever 26; which projects a considerable distance forward of the truck frame and is pivotally supported between its ends on the pin bearing 27. This bearing is formed on the front end of the diagonally disposed truck frame sections 8ᶠ, and nearly opposite to the center pin 11. The vertically floating equalizer rod 28, couples the forwardly projecting end of the equalizer 26, with the cross equalizer bar 5, thereby completing the means for transmitting equalizing forces from the driver springs 3, to the trailing truck springs 20.

A plurality of link notches or pivoted bearings, 23ᵉ and 26ᵉ, are formed in the adjoining ends of the corresponding levers, 23 and 26, and which are adapted to pivotally engage the equalizer link 25, which is disposed vertically between side walls forming the inverted U section of the frame sections 8ᶠ, as illustrated in Fig. 12. The leverage between the springs 3 and 20, may be changed to give any desired relative loading upon the truck springs 20, by placing a jack screw under the rear end of the link 26, and after blocking between the upper side of the link 23, and the truck frame section 8ᶠ, the lever 26 may be lifted to free the link 25 and permit moving it to the other pair of notches forming pivotal bearings. Heretofore it has been necessary to free the equalizer system of levers from their load and remove a fulcrum pin or laboriously make other difficult changes, all of which is obviated by this simple arrangement of placing the adjoining ends of the equalizers one above the other and coupling them with a link, as illustrated. Following usual practice, the arrangement of the springs, equalizers and links are made the same on both sides of the truck and locomotive, therefore, the description of one side applies to both.

The opposite front ends of the truck frame are caused to bear upward against the bottom side 1ⁿ, of the main frame 1, by the upward pull on the rods 28. This may be a sliding contact, or if it is desired to reduce the friction at this point, anti-friction members or rollers 27ᵇ, are interposed between the truck and main frame. This arrangement of providing a contact between the main frame and truck frame above the bearing 27, practically eliminates transverse stresses which would otherwise come upon the side frame sections 8ᶠ, from the equalizers, which by this construction are pivoted at this point. The rollers 27ᵇ, are shown mounted upon the pins 27; obviously other well known anti-friction, or friction, devices may be substituted for the rollers without departing from the spirit of my invention. The truck gives a forward and rearward motion to the rollers, or to a sliding surface of contact between the frames at 1ⁿ, in case the rollers are removed, because the contact point is laterally disposed with respect to the center pin 11, and on opposite sides of the truck and main frames. This truck swing does not cause an appreciable vertical movement of the truck equalizer spring rigging, because the rod members 28, are long and at right angles to such swing motion. When desired, by removing the rollers, sliding friction at the bearing 1ᵐ, may be utilized to retard the truck swing.

My improvement consists of pivotally mounting an equalizer on the front end of a radial truck frame and coupling it with the driver spring equalizing system and with another equalizer pivotally mounted on the truck frame nearer the spring and coupled thereto. Also to provide a housing for the equalizers at a considerable distance above the track for protection when the truck is derailed, to reduce truck frame stress, and provide a strong, light and compact construction of simple form.

What I claim is:

1. In a spring supported radial locomotive truck frame having axle box pedestals formed thereon and coupled at its front end to a locomotive spring supported main frame, the combination of a plurality of spring equalizers pivoted in front of each pedestal on said truck frame, and means adapted to couple said equalizers to the truck springs and locomotive main frame springs.

2. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, a plurality of pairs of equalizers pivoted on the truck frame, a pair being disposed in front of each axle box, means for coupling each pair to the front end of the corresponding truck spring, to each other, and to the driver spring equalizers.

3. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, said truck frame being formed with a pair of diagonally disposed side sections extending forward and inward under the main frame and having pivotal bearings formed thereon, a plurality of spring equalizers pivoted on each of said side sections in front of the axle boxes, and means for coupling said equalizers to each other, to the driver springs and to the corresponding truck spring.

4. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, a plurality of front spring equalizers pivotally supported on opposite sides at the front end of the truck frame, and disposed diagonally in a manner to project their front ends under the main frame a considerable distance forward of the truck frame, means for coupling said front equalizer ends to the driver springs, and means for coupling the equalizers to the truck springs.

5. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, a plurality of front spring equalizers pivotally supported on opposite sides at the front end of the truck frame, and disposed diagonally in a manner to project their front ends under the main frame a considerable distance forward of the truck frame, means for coupling said front equalizer ends to the driver springs, means for coupling the equalizers to the truck springs, and equalizers interposed, and coupled, between said truck springs and front equalizers.

6. In a spring supported radial locomotive truck frame having axle box pedestals formed thereon and coupled at its front end to a locomotive spring supported main frame, the combination of spring equalizers pivoted in front of the pedestals and on said frame which is adapted to inclose, or house, said equalizers for protection, said housing extending from the pedestals to near the front end of the truck frame, and means adapted to couple said equalizers to the truck and locomotive main frame springs.

7. In a spring supported radial locomotive truck frame having axle box pedestals formed thereon and coupled at its front end to a locomotive spring supported main frame, the combination of a plurality of spring equalizers pivoted in front of each pedestal on said truck frame, means adapted to couple said equalizers to the truck springs and locomotive main frame springs, a horizontally disposed flat sliding surface formed on and above said pedestals, and means for transmitting the truck burden from the locomotive main frame to said surface.

8. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, equalizer means pivotally supported upon the truck frame, at the front end thereof, and adapted to couple the truck springs to the driver springs, and means supported on the front end of the truck frame and adapted to engage the main frame for the purpose of resisting the upward pull from the driver springs that is transmitted to the truck springs by said equalizer means.

9. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, equalizer means pivotally supported upon the truck frame at the front end thereof and adapted to couple the truck springs to the driver springs, and means supported on the front end of the truck frame, comprising rollers and bearings, adapted to engage the main frame for the purpose of resisting the upward pull from the driver springs that is transmitted to the truck springs by said equalizer means.

10. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, a pair of pivotal equalizer bearings formed on the front end of said frame on opposite sides thereof, a center pin bearing formed on the front end of the frame between said equalizer bearings, means for coupling the center pin bearing to the main frame, and equalizers pivotally supported by said bearings, and means for coupling said equalizers to the truck and driver springs.

11. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, a frame bracket interposed between the truck and main frame, a rocker pivoted on said bracket, a sliding member interposed between the truck and the rocker and adapted to slide horizontally in a direction approximately at right angles to the swing of the rocker, for the purpose of giving a sliding resistance to the truck swing in one direction where the rocker has a motion, or swings, in another direction.

12. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, a sliding member and a rocker interposed between the truck and main frame, means for pivotally supporting the rocker in engagement with the sliding member, said rocker being adapted to move with its pivotal support in an approximately horizontal direction making a predetermined angle with the direction of motion of the sliding member for the purpose of providing a sliding resistance to the truck swing in one direction when the rocker and its support has a motion in another predetermined direction.

13. In a locomotive engine, the combination of a main frame having driver springs and equalizers mounted thereon, of a radial truck pivoted at its front end to the main frame, an axle and wheels supporting said truck frame, axle boxes mounted upon said axle, truck springs interposed between said axle boxes and the truck frame, means for coupling the rear ends of the springs to the truck frame, a sliding member engaging a horizontally disposed sliding surface formed on the truck frame, and adapted to slide forward and backward thereon, a rocker engaging said sliding member, a pivotal rocker support formed on a bracket attached to the locomotive frame and adapted to embrace the rocker and sliding member in a manner which permits the bracket and rocker to move laterally with respect to the truck for the purpose of compensating for the lateral truck swing about its pivoted connection with the main frame.

14. In a spring supported radial locomotive truck frame having axle box pedestals formed thereon and coupled at its front end to a locomotive spring supported main frame, the combination of a plurality of spring equalizers pivoted in front of each pedestal on said truck frame, means adapted to couple said equalizers to the truck springs and locomotive main frame springs, the adjoining ends of said equalizers being disposed one above the other and provided with a pivotal bearing, and means engaging said bearings for the purpose of coupling said equalizers to each other.

15. In a spring supported radial locomotive truck frame having axle box pedestals formed thereon and coupled at its front end to a locomotive spring supported main frame, the combination of a plurality of spring equalizers pivoted in front of each pedestal on said truck frame, means adapted to couple said equalizers to the truck springs and locomotive main frame springs, the adjoining ends of said equalizers being disposed one above the other and provided with a plurality of pivotal bearings, and means engaging said bearings for the purpose of coupling said equalizers to each other for providing an adjustment of the load carried by the springs.

16. In a spring supported radial locomotive truck frame having axle box pedestals formed thereon and coupled at its front end to a locomotive spring supported main frame, the combination with horizontally and diagonally disposed equalizer levers pivoted in front of said pedestals on said truck frame, said levers extending forwardly and inwardly to a point under the main frame for convenience in coupling them to the main frame springs and means adapted to couple said levers to the truck springs and locomotive main frame springs.

CHARLES L. HEISLER.

Witnesses:
    WILL. W. HAMBLY,
    E. I. SCHAUBER.